US011019025B2

(12) United States Patent
Venkataramanan et al.

(10) Patent No.: US 11,019,025 B2
(45) Date of Patent: *May 25, 2021

(54) SUPPORT FOR OPTIMIZED MICROSEGMENTATION OF END POINTS USING LAYER 2 ISOLATION AND PROXY-ARP WITHIN DATA CENTER

(71) Applicant: Cisco Technology, Inc., San Jose, CA (US)

(72) Inventors: Gautam Venkataramanan, Sunnyvale, CA (US); Umamaheswararao Karyampudi, Fremont, CA (US); Sundher Narayanaswamy, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/454,493

(22) Filed: Jun. 27, 2019

(65) Prior Publication Data

US 2019/0319916 A1 Oct. 17, 2019

Related U.S. Application Data

(63) Continuation of application No. 15/693,628, filed on Sep. 1, 2017, now Pat. No. 10,382,390.

(Continued)

(51) Int. Cl.
*G06F 15/16* (2006.01)
*H04L 29/12* (2006.01)
(Continued)

(52) U.S. Cl.
CPC .......... *H04L 61/2038* (2013.01); *H04L 63/10* (2013.01); *H04L 67/28* (2013.01); *H04L 67/38* (2013.01)

(58) Field of Classification Search
CPC ..... H04L 61/2038; H04L 63/10; H04L 67/28; H04L 67/38
See application file for complete search history.

(56) References Cited

U.S. PATENT DOCUMENTS 6,747,979 B1 * 6/2004 Banks ............... H04L 12/40091
370/401
9,270,590 B2 2/2016 A K et al.
(Continued)

OTHER PUBLICATIONS

"Cisco Application Centric Infrastructure Fundamentals", Cisco Systems, Inc., http://www.cisco.com/c/en/us/td/docs/switches/datacenter/aci/apic/sw/1-x/aci-fundamentals/b_ACI-Fundamentals.pdf, Aug. 1, 2014, pp. 1-100.
(Continued)

*Primary Examiner* — Philip B Tran
(74) *Attorney, Agent, or Firm* — Edell, Shapiro & Finnan, LLC

(57) ABSTRACT

A network device resolves a destination address of an endpoint in an endpoint isolation environment. The network device receives a request for a destination address associated with a destination endpoint. The request originates from an isolated source endpoint. The network device determines whether the destination address is stored on the network device in association with the destination endpoint. Responsive to a determination that the destination address is not stored in association with the destination endpoint, the network device generates a proxy request for the destination address, and sends the proxy request to at least one endpoint attached to the network device. The network device receives a proxy response from the destination endpoint that includes the destination address. The network device stores the destination address in association with the destination endpoint.

20 Claims, 12 Drawing Sheets

Related U.S. Application Data

(60) Provisional application No. 62/491,758, filed on Apr. 28, 2017.

(51) Int. Cl.
*H04L 29/08* (2006.01)
*H04L 29/06* (2006.01)

(56) References Cited

U.S. PATENT DOCUMENTS

| | | |
|---|---|---|
| 9,497,039 B2 | 11/2016 | Greenberg et al. |
| 9,621,373 B2 | 4/2017 | Hwang |
| 10,382,390 B1 * | 8/2019 | Venkataramanan .... H04L 63/10 |
| 2012/0087235 A1 | 4/2012 | Smith et al. |
| 2014/0064246 A1 | 3/2014 | Baillargeon |
| 2015/0124645 A1 | 5/2015 | Yadav et al. |
| 2015/0124809 A1 | 5/2015 | Edsall et al. |
| 2015/0124823 A1 | 5/2015 | Pani et al. |
| 2015/0381484 A1 * | 12/2015 | Hira .................... H04L 12/4633 370/390 |
| 2016/0036620 A1 | 2/2016 | Dunbar et al. |
| 2016/0277355 A1 | 9/2016 | Shetty et al. |
| 2017/0032011 A1 | 2/2017 | Song et al. |
| 2018/0091392 A1 | 3/2018 | Richards et al. |
| 2018/0255092 A1 | 9/2018 | Thubert et al. |

OTHER PUBLICATIONS

"Cisco Application Centric Infrastructure Fundamentals", Cisco Systems, Inc., http://www.cisco.com/c/en/us/td/docs/switches/datacenter/aci/apic/sw/1-x/aci-fundamentals/b_ACI-Fundamentals.pdf, Aug. 1, 2014, pp. 101-200.

"Cisco Application Centric Infrastructure Fundamentals", Cisco Systems, Inc., http://www.cisco.com/c/en/us/td/docs/switches/datacenter/aci/apic/sw/1-x/aci-fundamentals/b_ACI-Fundamentals.pdf, Aug. 1, 2014, pp. 201-290.

* cited by examiner

SUPPORT FOR OPTIMIZED MICROSEGMENTATION OF END POINTS USING LAYER 2 ISOLATION AND PROXY-ARP WITHIN DATA CENTER

PRIORITY CLAIM

This application is a continuation of U.S. patent application Ser. No. 15/693,628, filed Sep. 1, 2017, now U.S. Pat. No. 10,382,390, which claims priority to U.S. Provisional Application No. 62/491,758, filed Apr. 28, 2017, the entirety of which is incorporated herein by reference.

TECHNICAL FIELD

The present disclosure relates to data center networking.

BACKGROUND

In modern data centers, workloads are becoming more agile and evolving to include bare metal, virtual machines (VMs) across multi-hypervisors and container endpoints. Security across these workloads is one of the main concerns, particularly how endpoints within an application tier of a multi-tiered application can be segmented. Microsegmentation is a technique that uses "attributes" to classify endpoints of an End Point Group (EPG). These attributes can be based on virtual machine and network attributes. For example, a data center administrator can dynamically enforce security policies, quarantine compromised or rogue endpoints based on VM attributes (i.e. VM name, VM id, Operating System (OS) type) and/or network attributes (IP, MAC addresses). Also, the data center administrator can implement microsegmentation across multi-tiered applications hosted across multiple hypervisors and bare metal server environments with granular endpoint security enforcement.

Traditionally microsegmentation within an Application Centric Infrastructure (ACI) has been implemented by assigning unique virtual local area networks (VLANs) to the end points so that the end points are segmented. This model does not stop end points from learning the real MAC address of other microsegmented end points in the same bridge-domain, thereby putting the VMs under constant threat of MAC spoof attack. If any endpoints get compromised, another end point can send traffic under the disguise of other end points, leading to a major security hole within data centers. Also, VLAN scale is linearly affected along with the end points which require this feature.

DESCRIPTION OF EXAMPLE EMBODIMENTS

Overview

Presented herein is a method for resolving a destination address of an endpoint in an endpoint isolation environment. The method includes receiving at a network device, a first request for a destination address associated with a destination endpoint. The first request originates from an isolated source endpoint. The network device determines whether the destination address is stored on the network device in association with the destination endpoint. Responsive to a determination that the destination address is not stored in association with the destination endpoint, the network device generates a proxy request for the destination address, and sends the proxy request to at least one endpoint attached to the network device. The network device receives a proxy response from the destination endpoint that includes the destination address. The network device stores the destination address in association with the destination endpoint.

Detailed Description

Presented herein are techniques that define a new paradigm to achieve microsegmentation. Proxy-ARP and isolation is provided such that end points are prevented from doing any media access control (MAC) address spoofing attacks. Only regulated traffic will flow through the system, since only Layer 3 communication is permitted between within known endpoints. The endpoints can communicate with each other using microsegmented-based policy control tags and contracts.

Figure 1:
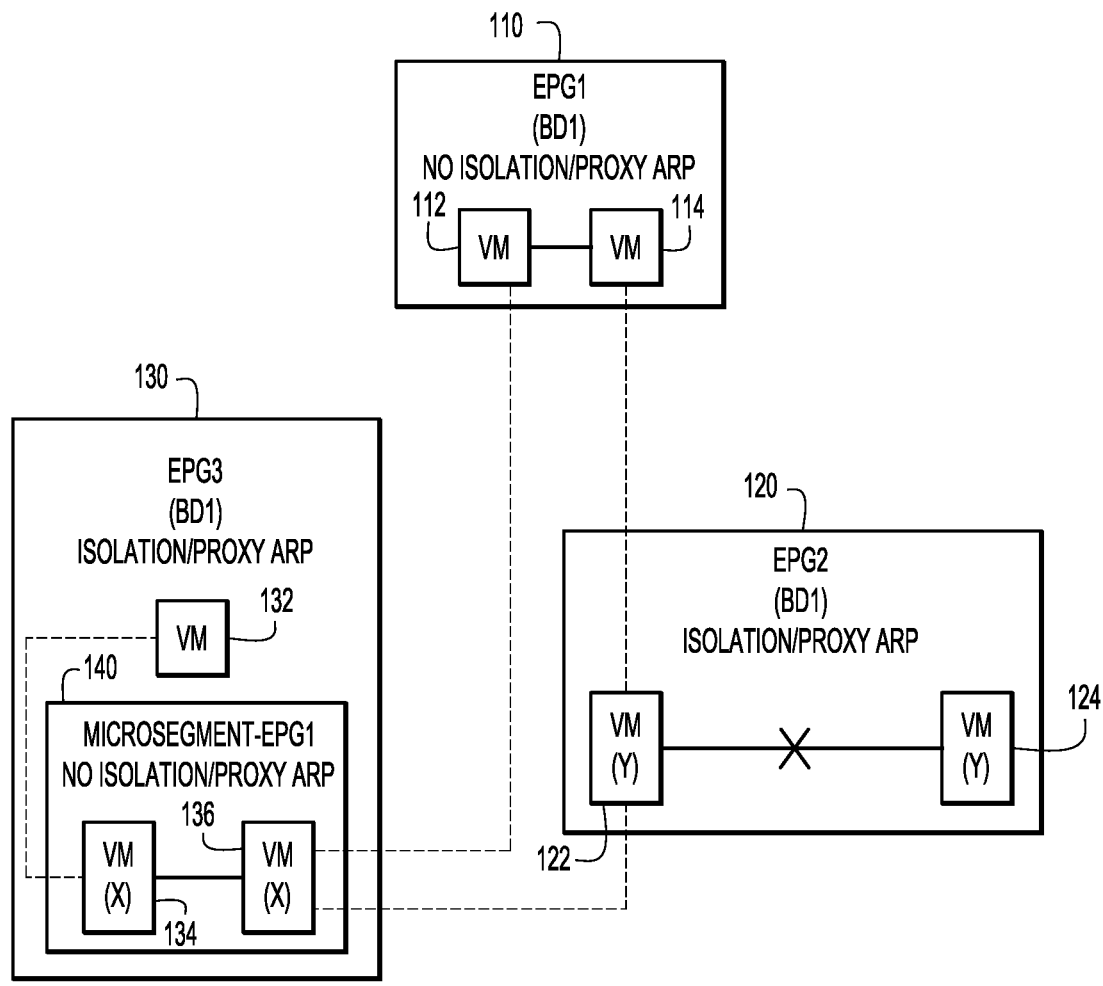
FIG. 1 is a high-level diagram depicting microsegmentation of end points using Layer 2 proxy-Address Resolution Protocol (ARP), according to an example embodiment.

Reference is made first to FIG. 1 for a high-level description of the computing environment for communicating between endpoints. The environment includes an endpoint group (EPG) 110 with virtual machine (VM) 112 and VM 114. The EPG 110 is configured with a policy of not isolating intra-EPG communication (e.g., between VM 112 and VM 114), which removes the need for proxy Address Resolution Protocol (ARP) support. The environment also includes EPG 120 with VM 122 and VM 124. The EPG 120 is configured with a policy of isolating intra-EPG communication and support proxy ARP address resolution. The environment further includes EPG 130 with VM 132, VM 134, and VM 136. The EPG 130 is configured with a policy of isolating intra-EPG communication and support proxy ARP address resolution. Within the EPG 130, a microsegment 140 includes VM 134 and VM 136. The microsegment 140 is configured with a policy of not isolating intra-EPG communication (e.g., between VM 134 and VM 136).

Communication between VMs in different EPGs are controlled by contracts, which specify whether VMs in each EPG of the contract are permitted to communicate. Contracts may also include microsegments, such as microsegment 140, which overrides any policy from the base EPG. In FIG. 1, communication that is controlled by contracts are depicted as dashed lines, while allowed intra-EPG communication is depicted by a solid line.

The environment enforces three functions:
1. Layer 2 endpoint isolation enforcement per EPG.
2. Proxy-ARP support per EPG.
3. Microsegmented Policy Control Tag (pcTag) derivation based on Internet Protocol/Media Access Control Address (IP/MAC) of end points.

In network fabric implementing the techniques presented herein, a single bridge domain (BD) can have multiple forwarding domains (FDs), such as VLANs or Virtual Extensible Local Area Networks (VxLANs). In the example of FIG. 1, VM 134 and VM 136 may be classified to unique pcTag 'X' using either VM attributes or MAC or IP attributes. VM 122 and VM 124 (pcTag 'Y' based on VLAN) will be able to communicate with VM 134 and VM 136 using the destination MAC (DMAC) as BD1's MAC address, since both EPG 130 and EPG 120 are proxy-ARP enabled and also have contracts between 'X' and 'Y'.

Microsegment Based pcTag

Within a typical network fabric, endpoints traditionally will get a pcTag associated with the EPG. This pcTag is the classification context used to identify each endpoint. Communication within an EPG is enabled by default, and inter-EPG communication is through security policies called a "contract." Any endpoint within an EPG typically will use the EPG's pcTag. That is, the MAC or IP address of end points will be classified to select a base EPG's pcTag. Traditionally, to put some end points across EPGs into a microsegment, multiple VLANs were used.

To solve VLAN scaling issues, each endpoint is classified with its MAC or IP address to give a new pcTag per microsegment. This will be done without consuming any extra resources apart from the allocation of a single "pcTag" for the microsegment. Currently, in one example embodiment, a network fabric may support allocation of 64 k unique pcTags. This means that there can be up to 64 k unique microsegments. This is likely adequate to solve current data center needs which usually segment traffic based on VLANs (4 k).

There has been concern about MAC address spoofing attacks within data centers. The techniques presented herein enable Layer 2 traffic isolation of microsegmented end points by enabling proxy-ARP for these end points.

Proxy-ARP

Proxy ARP is enabled on an EPG that requires microsegmentation. This proxy-ARP behavior is slightly different from traditional proxy-ARP.

When proxy-ARP is enabled on an EPG, if endpoint A sends an ARP request for endpoint B and if endpoint B is learned within the fabric, then endpoint A will receive a proxy-ARP response from a BD MAC.

If endpoint A sends an ARP request for endpoint B, and if endpoint B is not already learned within fabric, then the fabric will not send a proxy-ARP response back to endpoint A at this point. This is to prevent unnecessary traffic within the fabric until the endpoint is learned. Instead, the fabric will send a proxy-ARP glean request to all member ports of the BD. Endpoint B will receive this proxy-ARP glean request and then it will respond back to the fabric. At this point, the fabric does not send a proxy-ARP response to endpoint A, but endpoint B is learned within the fabric. If endpoint A sends another ARP request to endpoint B, then the fabric will send a proxy-ARP response from the BD MAC address.

The following example describes proxy ARP resolution steps for communication between clients VM1 and VM2. A network fabric controller is a unifying point of automation and management for the network fabric. The controller provides centralized access to all fabric information.

Step 1: VM1 to VM2 communication is desired.
Step 2: VM1 sends an ARP request with a broadcast MAC address to VM2.
Step 3: The ACI fabric floods the proxy ARP request within the bridge domain (BD).
Step 4: VM2 sends an ARP response to the ACI fabric.
Step 5: VM2 is learned.
Step 6: VM1 sends another ARP request with a broadcast MAC address to VM2.
Step 7: The ACI fabric sends a proxy ARP response to VM1.

Final ARP table state:

| Device | Entries |
| --- | --- |
| VM1 | IP = VM2 IP; MAC = BD MAC |
| ACI Fabric | IP = VM1 IP; MAC = VM1 MAC |
| | IP = VM2 IP; MAC = VM2 MAC |
| VM2 | IP = VM1 IP; MAC = BD MAC |

Layer 2 End Point Isolation

In one example, the network fabric is made up of multiple nodes (e.g., a Clos network). Providing a microsegmented EPG isolated ensures that all the Layer 2 ARP broadcast requests get dropped across microsegmented endpoints. When communication is occurring across Top of Rack (ToR) switches, packets are sent to the spine switches with an overlay header (e.g., an iVxLAN header). The system has capability to carry only one outer VLAN header which carries intra-VLAN identifier. This leads to the challenge in carrying enough context to other devices in a Clos model to determine whether the packet originated from a microsegmented endpoint. To address this, the source microsegmented context may be carried within overlay differentiated services code point (DSCP), class of service (COS) and drop eligible indicator (DEI) fields within the VxLAN header.

Figure 2:
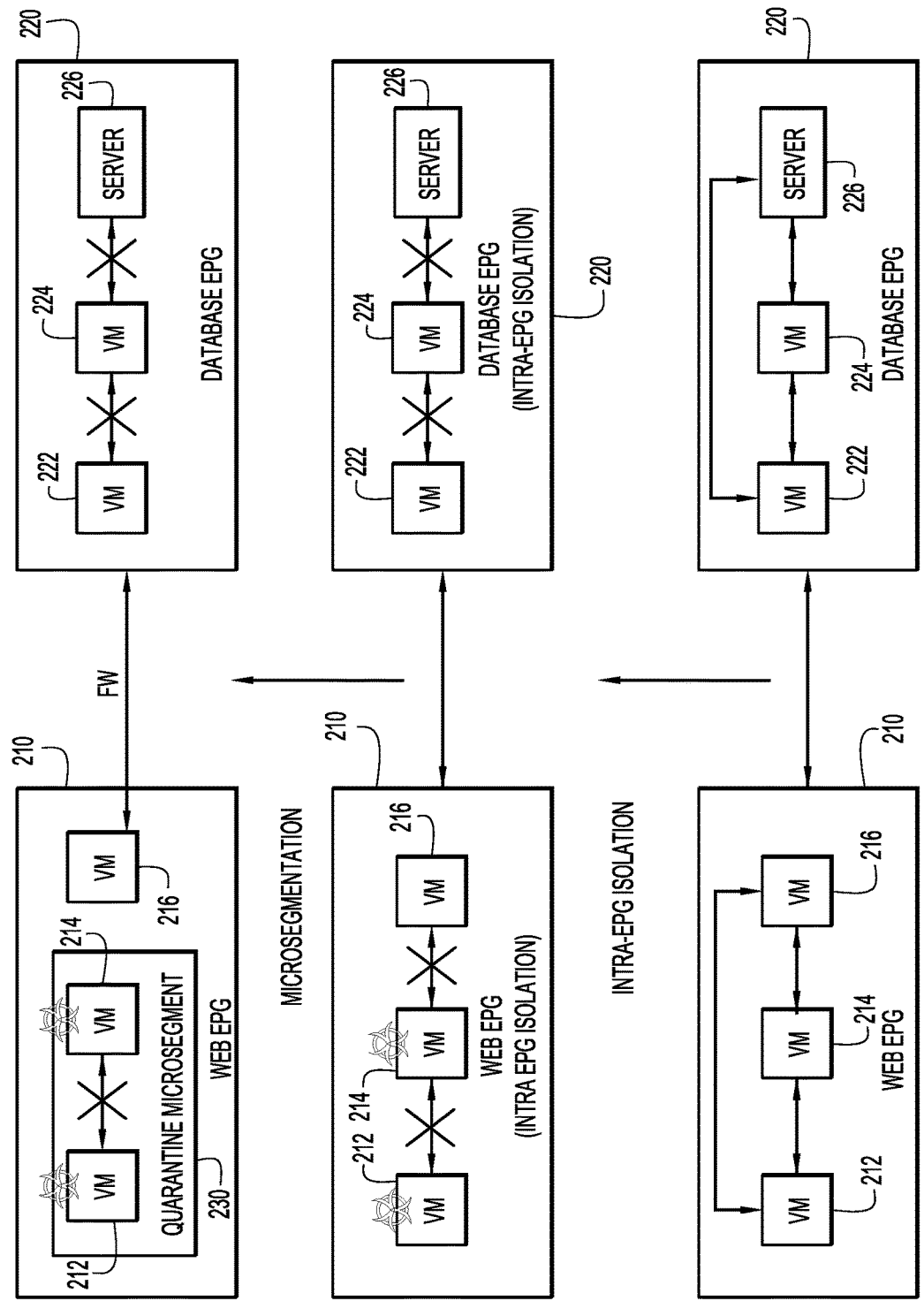
FIG. 2 illustrates intra-EPG isolation and microsegmentation of end points, according to an example embodiment.

Referring now to FIG. 2, an example of intra-EPG isolation combined with microsegmentation is shown. The example of FIG. 2 depicts communication between a web EPG 210 comprising VM 212, VM 214, and VM 216 with a database EPG 220 comprising VM 222, VM 224, and bare metal server 226. Alternatively, the server 226 may be another virtual machine similar to VM 222 and VM 224. When intra-EPG isolation is enforced on EPG 210, communication between VM 212, VM 214, and VM 216 is halted, but each of these VMs can still communicate with any of the machines in EPG 220 due to the contract between EPG 210 and EPG 220. Similarly, when intra-EPG isolation is enforced on EPG 220, communication between VM 222, VM 224, and server 226 is halted, but each of these machines can still communicate with any of the VMs in EPG 210. If VM 212 and VM 214 become infected, microsegmentation is used to isolate them completely in a quarantine microsegment 230. This prevents the infected VMs from spreading to any of the machines in the EPG 220, since there is no contract between the quarantine microsegment 230 and the EPG 220.

Numerous advantages are achieved by this example. First, due to microsegmentation, malicious VMs/baremetals/containers can be quarantined. With isolation of microsegmented endpoints, all the broadcast Layer 2 ARP requests are filtered. Second, with proxy-ARP, the real MAC address of microsegmented VMs/baremetals are not visible to each other, leading to greater security from MAC spoofing attacks. In addition, after proxy-ARP is resolved, only moderated Layer 3 traffic is allowed to flow between microsegmented endpoints. Separate VLANs for each of the VMs are no longer needed to support microsegmentation. More microsegments can be created (up to 64 k), not restricted to just 4 k VLANs. Microsegmentation of endpoints and intra-EPG isolation enforcement policies can also be combined to further isolate all endpoints within a microsegment which prevents rogue endpoints from moving laterally within the microsegment in a data center.

Isolating ARP/Neighbor Discovery (ND) (Including Layer 2 Unknown Unicast, Broadcast and Multicast Traffic)

Ingress and egress access control lists (ACLs) are used to drop Layer 2 traffic between microsegmented (isolated) endpoints. This is to prevent any unmoderated traffic crossing between microsegmented endpoints.

Ingress ACL @ ingress ToR: Any Layer 2 packet ingressing via an isolated endpoint will hit the below rule:

InPorts: Front Panel of leaf+layer 2 traffic+
        EPG=isolated=>Mark inner and overlay cos=7,
        DEI=1, dscp=63

Egress ACL @ egress ToR: If packet ingressed from an isolated endpoint and also egressing via another isolated endpoint, then the packet gets dropped.

InPorts=Internal (facing spine) of leaf+
        EPG=isolated+COS=7, DEI=1=>Drop If the packet is switched intra-ToR, then packets will not have any overlay iVxLAN header. So inner COS and DEI are marked appropriately to carry source isolation context.

If packets are moving across ToRs, egress ternary content-addressable memory (TCAM) supports matching only on inner COS, DEI of the packet. In the ingress pipeline of an egress ToR, the overlay COS=7 and DEI=1 are classified and pushed into inner COS and DEI through Quality of Service (QoS) marking tables.

When IEEE 802.1p preservation/remarking is used, overlay DSCP is used at the egress ToR to classify on overlay DSCP and re-derive inner COS, DEI and queuing class. For this solution, the overlay DSCP=63 will be classified to re-derive inner COS=7 and DEI=1 in the egress ToR when traffic is passing from spine to leaf.

Since the overlay COS=7, DEI=1 and DSCP=63 are reserved values for this solution, special care in the spine switches is taken to preserve this information even when traffic is traversing the fabric that is spans across multiple PODs.

The ACI fabric supports isolation of VLAN and VxLAN encapsulated EPGs. The TCAM scale will be an issue if each of the VLAN and VxLANs are individually matched in the leaves to hit the above TCAM rules. However, as an optimization, VLAN EPGs are identified by a single internal label derived by isolated VLAN reserved for this solution. In case of isolated VxLAN EPGs, the VxLAN virtual network identifiers (VNIDs) are kept in reserved range 0x900000 to 0x90FFFF so that isolated VxLANs can be identified through just a single TCAM entry within the fabric.

No Isolation of Known Unicast Traffic

The pcTag is the classification context of an EPG within ACI fabric. To prevent known Layer 2/Layer 3(L2/L3) intra-EPG traffic, deny contracts are installed in a zoning rule policy TCAM. However, this rule is enabled only when a user explicitly enabled intra-EPG isolation enforcement for the EPG. Otherwise, this will not take effect.

Specific Rules to Trap ARP/ND Packets

Special ACLs are installed in all ToRs (both ingress and egress) to trap ARP/ND requests and carry context within the fabric to indicate that an ARP/ND request packet is coming from a microsegmented endpoint. The ACL rules may be detailed due to multiple ARP forwarding modes (unicast versus flood within the BD). The following table provides an example high level view of one implementation.

| Origin Port | Ingress/Egress ACL | Destination EP known/unknown | Destination EP available in local TOR | Action |
|---|---|---|---|---|
| Front Panel | Ingress | known | yes | Copy packets to supervisor with special context within iETH header so that proxy-ARP response will be sent |
| Front Panel | Ingress | known | no | Send packet to spine. Spine will send ARP request to correct ToR which has the endpoint |
| Internal | Ingress | known | yes | Copy packets to supervisor with special context within IETH header so that proxy-ARP response will be sent. |
| Front Panel | Ingress | unknown | — | Send a copy of the packet to supervisor with special context within iETH header, so that local leaf can send proxy-ARP glean request to all ports of |

-continued

| Origin Port | Ingress/Egress ACL | Destination EP known/unknown | Destination EP available in local TOR | Action |
|---|---|---|---|---|
| Internal | Ingress | unknown | — | same BD in this ToR. Send the original packet to spine, so that packet can be sent to all other ToRs in the fabric. Copy packets to supervisor with special context within iETH header so that supervisor can send proxy ARP glean request on front panel ports belonging to the BD in that ToR. |

The above rules are active only if packets are coming from microsegmented endpoints. For this fabric will use COS=7, DEI=1 and DSCP=61 in the overlay VxLAN header.

Following Identifies When Proxy-ARP Behavior Will Kick in within the ACI Fabric

| ARP/ND communication from/to | Normal endpoint | Microsegmented endpoint with layer 2 isolation and proxy-ARP enabled |
|---|---|---|
| Normal end-point | ARP | ARP |
| Microsegmented endpoint with layer 2 isolation and proxy ARP enabled | ARP | Proxy ARP |

Proxy-ARP with Layer 2 Isolation—Scenarios

Due to the Clos model, the implementation of Layer 2 isolation and proxy-ARP is challenging. The behavior is different for ARP unicast (spine unicasts to particular leaf) and BD flood mode (spine floods to all leaves).

Figure 3:
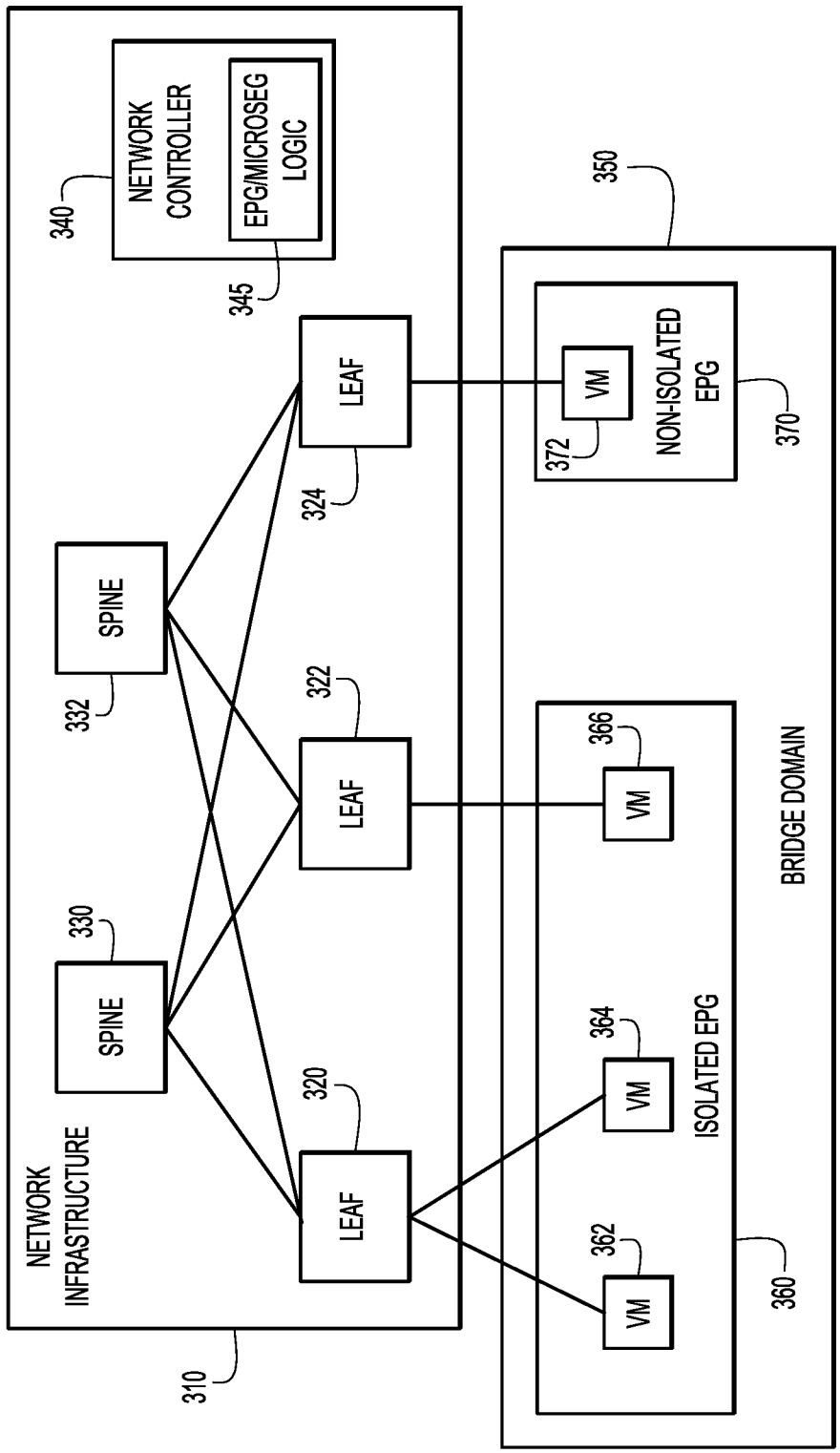
FIG. 3 is a simplified block diagram of a system for communicating between isolated and non-isolated endpoints, according to an example embodiment.

Referring now to FIG. 3, a simplified block diagram of a computing environment that implements proxy ARP resolution for communicating between endpoints that may be in isolated EPGs. The network infrastructure 310 includes a Clos network with leaf nodes 320, 322, and 326 each connected to spine nodes 330 and 332. The network infrastructure includes a network controller 340 with EPG/microsegmentation logic 345. The network infrastructure enables communication between computers in a bridge domain 350. Within the bridge domain 350, an isolated EPG is defined comprising VM 362, VM 364, and VM 366. Additionally, a non-isolated EPG 370 is defined comprising VM 372.

FIG. 3 provides one example of a computing environment, but the techniques presented herein are not limited to the specific configuration depicted. For instance, the network infrastructure 310 may include additional spine nodes and/or leaf nodes. The leaf nodes may connect to computing devices in other bridge domains. Some or all of the endpoints described as virtual machines (e.g., VM 362, VM 364, VM 366, and/or VM 372) may be physical computing devices instead of virtual computing devices.

FIGS. 4-10 show specific examples of proxy ARP implementation from an isolated endpoint (e.g., VM 362) to different isolated/non-isolated endpoints (e.g., VM 366, or VM 372) under different conditions of the network infrastructure 310. For instance, the location of the destination endpoint may be known or unknown in the network infrastructure 310. Additionally, the network infrastructure may be configured to send ARP requests in a unicast mode or a flooding mode. Each of these conditions of the network infrastructure 310 leads to different sequences of messages passed in the network infrastructure to properly handle the intra-EPG isolation and microsegmentation of the endpoints.

Figure 4:
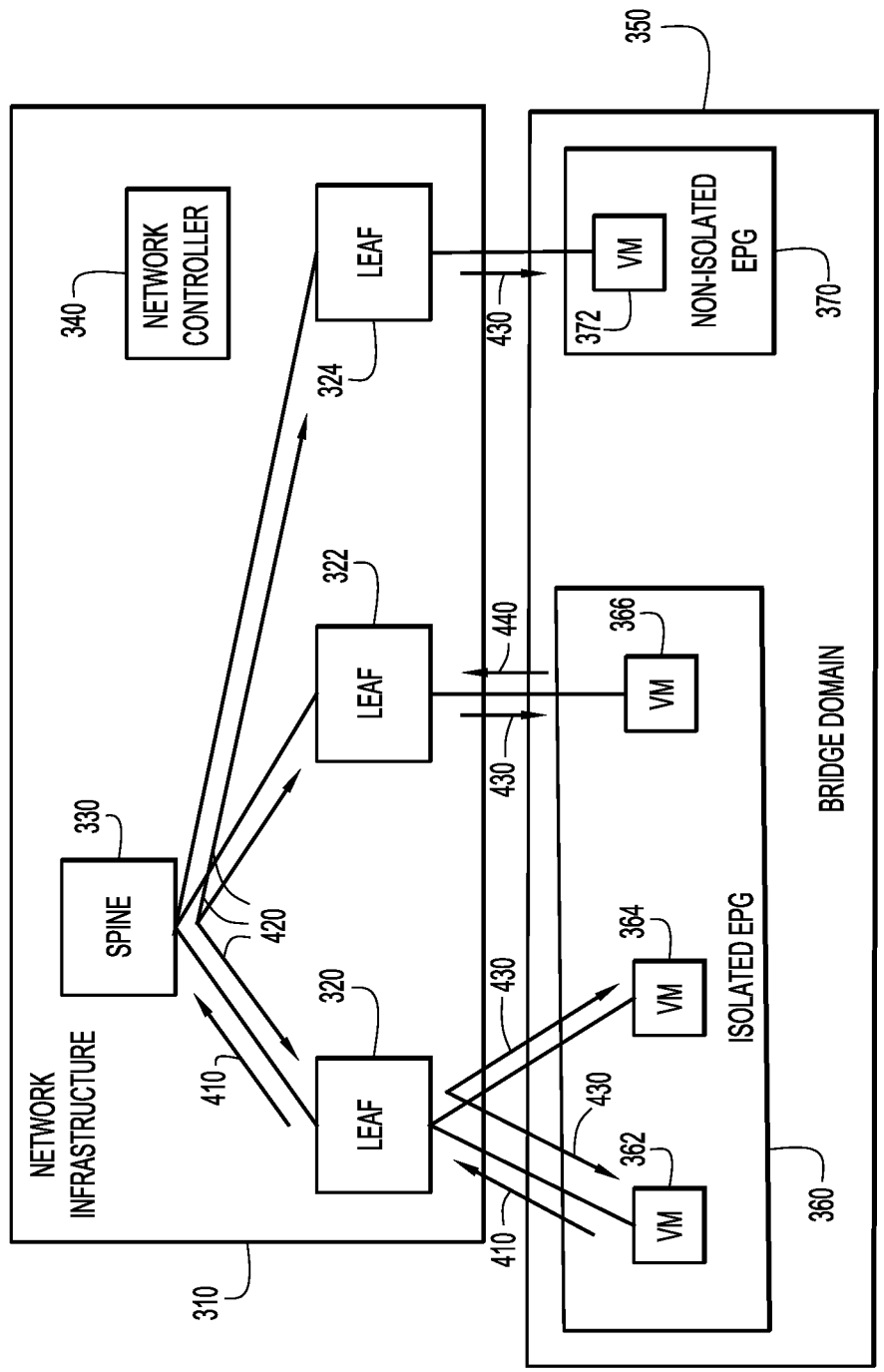
FIG. 4 is a simplified block diagram for initiating communication between two isolated endpoints in a unicast ARP environment, in which the address of the destination endpoint is unknown, according to an example embodiment.

Referring specifically to FIG. 4, a simplified block diagram illustrates a proxy ARP resolution for an isolated destination endpoint VM 366 that is not known to the network infrastructure 310, and in which the network infrastructure 310 is configured to send unicast ARP requests. Initially, the source endpoint VM 362 sends an ARP request 410 to determine the MAC address of destination endpoint VM 366. Leaf node 320 receives the ARP request 410 and determines that the leaf node 320 has not stored the MAC address of the VM 366, e.g., the VM 366 is not attached to the leaf node 320. The leaf node 320 forwards the ARP request 410 to the spine node 330, and the spine node 330 also determines that the MAC address for the VM 366 is not stored in the network infrastructure 310.

The spine node 330 initiates a glean ARP request 420, and sends the glean ARP request 420 to all of the leaf nodes that communicate with the bridge domain 350, i.e., leaf nodes 320, 322, and 324. Each of the leaf nodes 320, 322, and 324 receives the glean ARP request 420 and generates a proxy ARP request 430. The proxy ARP request 430 is generated with the network address associated with the network infrastructure 310 (e.g., the Switched Virtual Interface (SVI) MAC and IP addresses). Each leaf node sends the proxy ARP request 430 to any attached endpoints in the bridge domain 350.

The VM 366 receives the proxy ARP request 430 and responds with an ARP response 440 directed to the leaf node 322 of the network infrastructure 310. Since the VM 366 only received the proxy ARP 430 with a source address corresponding to the network infrastructure 310, instead of the actual ARP request 410 from the VM 362, the VM 366 does not have access to the MAC address of the source VM 362. Once the leaf node 322 receives the ARP response 440, the leaf node 322 stores the MAC address of the VM 366, and can send a proxy ARP response for VM 366 in response to any subsequent ARP requests.

Figure 5:
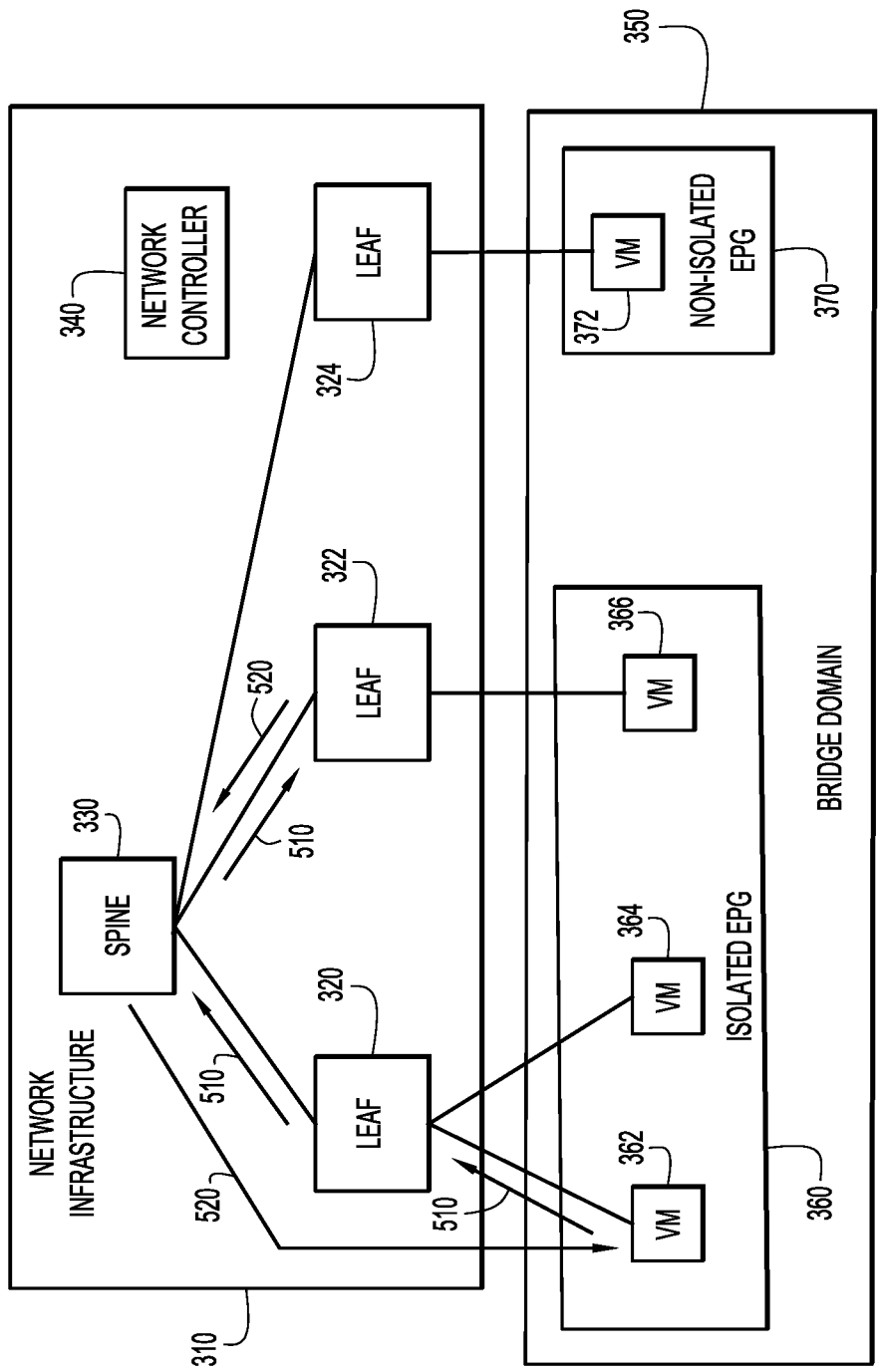
FIG. 5 is a simplified block diagram for initiating communication between two isolated endpoints in a unicast ARP environment, in which the address of the destination endpoint is known, according to an example embodiment.

Referring now to FIG. 5, a simplified block diagram illustrates a proxy ARP resolution for an isolated destination endpoint VM 366 that is known to the network infrastructure 310 (e.g., through the leaf node 322), and in which the network infrastructure 310 is configured to send unicast ARP requests. The source endpoint VM 362 sends an ARP request 510 to determine the MAC address of destination endpoint VM 366. In one example, the ARP request 510 is a second ARP request that is sent after the VM 362 did not receive an ARP response (e.g., ARP response 440 shown in FIG. 4) in response to a first ARP request (e.g., ARP request 410 shown in FIG. 4).

Similar to the process described in FIG. 4, the leaf node 320 receives the ARP request 510 and determines that the leaf node 320 has not stored the MAC address of the VM 366, e.g., the VM 366 is not attached to the leaf node 320. The leaf node 320 forwards the ARP request 510 to the spine node 330. The spine node 330 determines that the leaf node 322 is attached to the destination VM 366 and directs the ARP request 510 to the leaf node 322.

The leaf node 322 receives the ARP request 510 for the destination VM 366 and determines that both the source and the target of the ARP request 510 are in an isolated EPG. The leaf node 322 generates a proxy ARP response 520 that associates a network address associated of the network infrastructure 310 with the target VM 366. In one example, the ARP request 510 is punted to the software supervisor in the leaf node 322, which generates the proxy ARP response 520. The leaf node 322 sends the proxy ARP response 520 back to the VM 362 that initiated the ARP request 510, enabling the isolated VM 362 to communicate with the isolated VM 366 though the network infrastructure 310 through Layer 3 communications.

Figure 6:
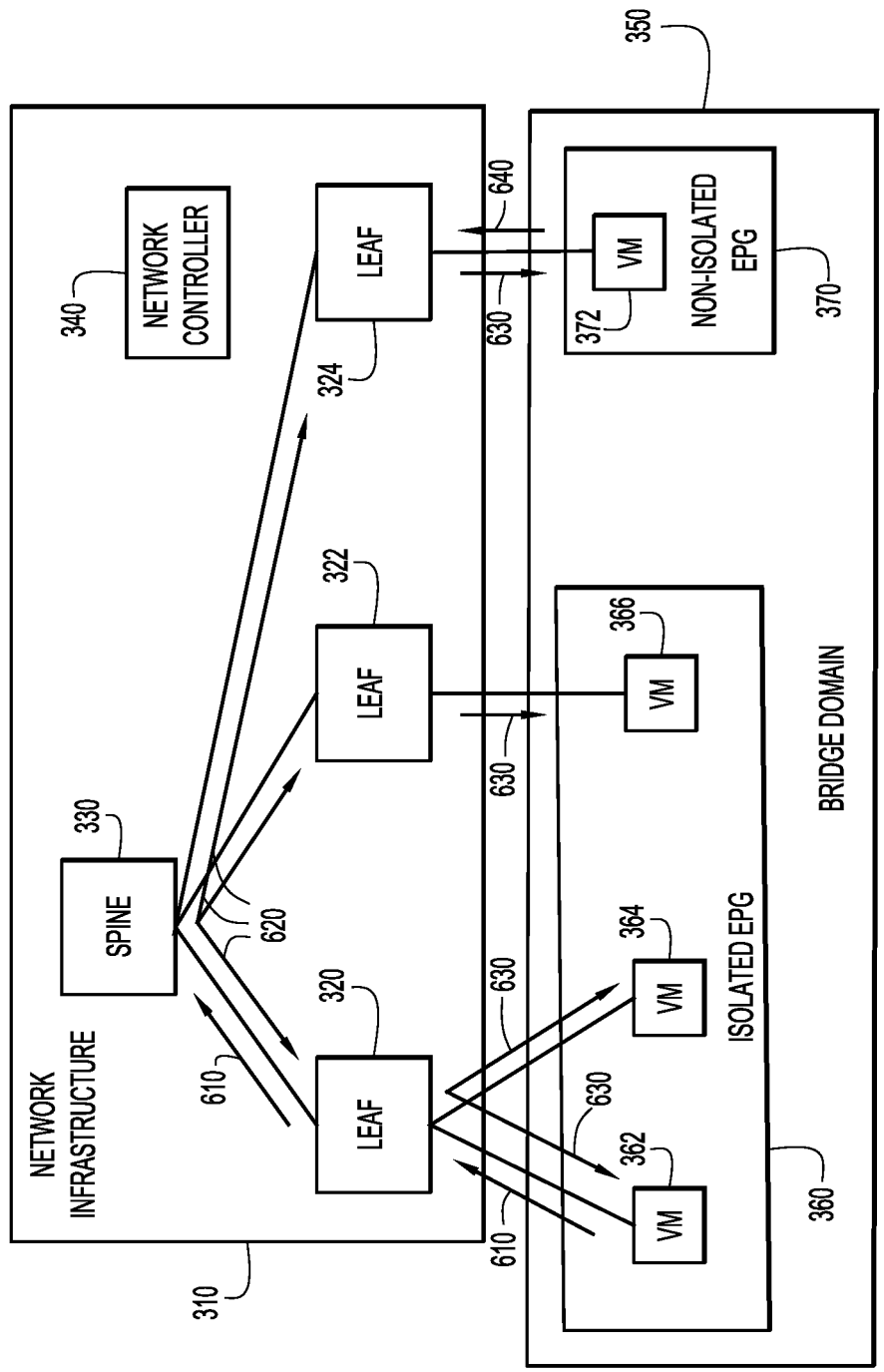
FIG. 6 is a simplified block diagram for initiating communication from an isolated endpoint to a non-isolated endpoint in a unicast ARP environment, in which the address of the destination endpoint is unknown, according to an example embodiment.

Referring now to FIG. 6, a simplified block diagram illustrates a proxy ARP resolution for a non-isolated destination endpoint VM 372 that is not known to the network infrastructure 310, and in which the network infrastructure 310 is configured to send unicast ARP requests. Initially, the source endpoint VM 362 sends an ARP request 610 to determine the MAC address of destination endpoint VM 372. Leaf node 320 receives the ARP request 610 and determines that the leaf node 320 has not stored the MAC address of the VM 372, e.g., the VM 372 is not attached to the leaf node 320. The leaf node 320 forwards the ARP request 610 to the spine node 330, and the spine node 330 also determines that the MAC address for the VM 372 is not stored in the network infrastructure 310.

The spine node 330 initiates a glean ARP request 620, and sends the glean ARP request 620 to all of the leaf nodes that communicate with the bridge domain 350, i.e., leaf nodes 320, 322, and 324. Each of the leaf nodes 320, 322, and 324 receives the glean ARP request 620 and generates a proxy ARP request 630. The proxy ARP request 630 is generated with the network address associated with the network infrastructure 310 (e.g., the Switched Virtual Interface (SVI) MAC and IP addresses). Each leaf node sends the proxy ARP request 630 to any attached endpoints in the bridge domain 350.

The VM 372 receives the proxy ARP request 630 and responds with an ARP response 640 directed to the leaf node 324 of the network infrastructure 310. Once the leaf node 324 receives the ARP response 640, the leaf node 324 stores the MAC address of the VM 372, and can send a proxy ARP response for VM 366 in response to any subsequent ARP requests. However, since the VM 372 is in the non-isolated EPG 370, there are no restrictions on the VM 372 receiving the actual MAC address of the VM 362 or on the VM 362 receiving the actual MAC address of the VM 372. In this instance, the leaf node 324 is capable of generating a proxy ARP response for the VM 372, but is not required to enforce proxy ARP conditions due to the non-isolated EPG 370.

Figure 7:
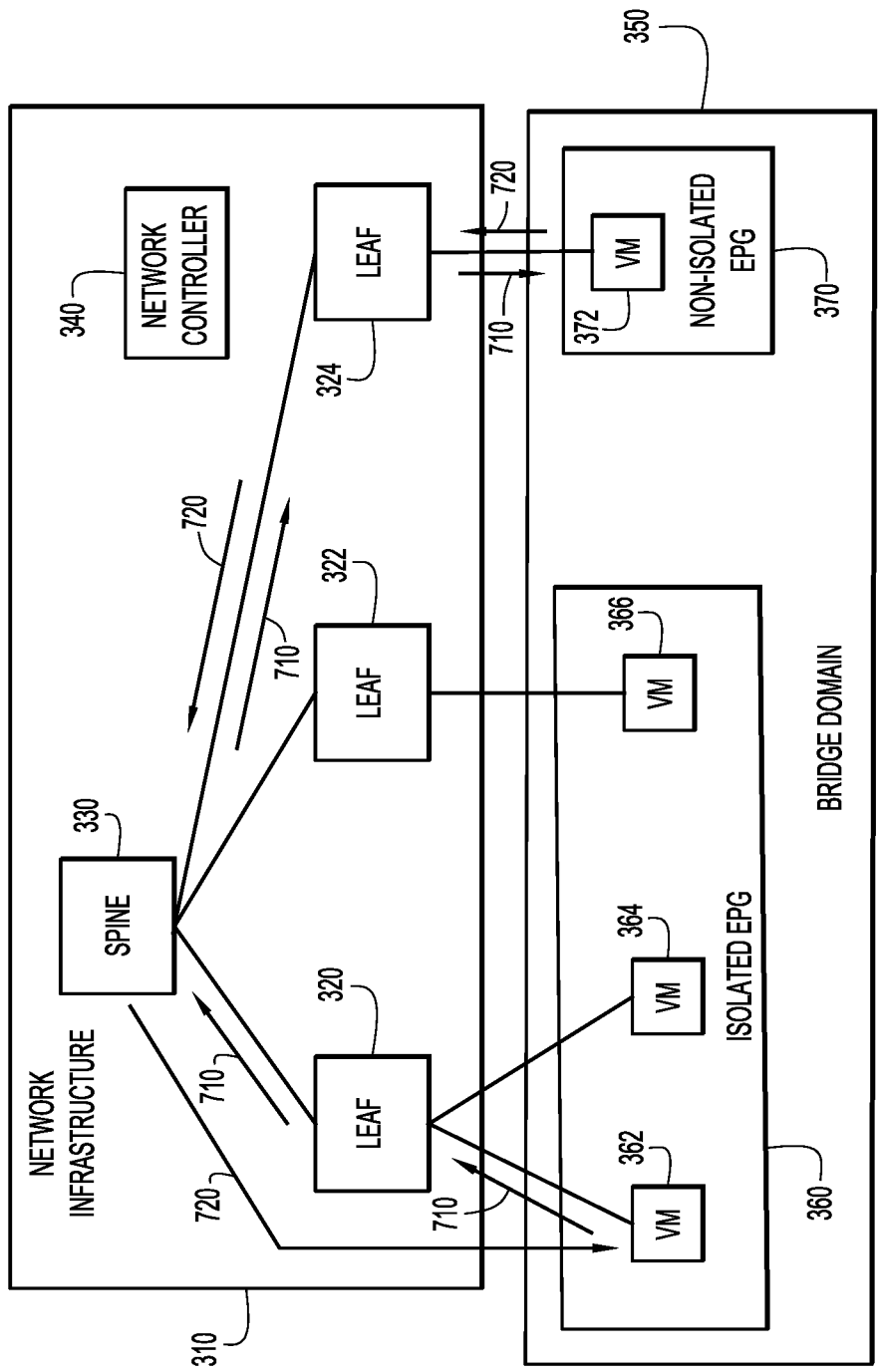
FIG. 7 is a simplified block diagram for initiating communication from an isolated endpoint to a non-isolated endpoint in a unicast ARP environment, in which the address of the destination endpoint is known, according to an example embodiment.

Referring now to FIG. 7, a simplified block diagram illustrates a proxy ARP resolution for a non-isolated destination endpoint VM 372 that is known to the network infrastructure 310 (e.g., through the leaf node 324), and in which the network infrastructure 310 is configured to send unicast ARP requests. The source endpoint VM 362 sends an ARP request 710 to determine the MAC address of destination endpoint VM 372. In one example, the ARP request 710 is a second ARP request that is sent after the VM 362 did not receive an ARP response (e.g., ARP response 640 shown in FIG. 6) in response to a first ARP request (e.g., ARP request 610 shown in FIG. 6).

Similar to the process described in FIG. 6, the leaf node 320 receives the ARP request 710 and determines that the leaf node 320 has not stored the MAC address of the VM 372. The leaf node 320 forwards the ARP request 710 to the spine node 330. The spine node 330 determines that the leaf node 324 is attached to the destination VM 372 and directs the ARP request 710 to the leaf node 324.

The leaf node 324 receives the ARP request 710 for the destination VM 372 and determines that the target of the ARP request 710 is not in an isolated EPG. Since the VM 372 is not isolated, the leaf node 324 forwards the actual ARP request 710 from the VM 362 to the VM 372. The VM 372 receives the ARP request 710 and generates an ARP response 720 including the MAC address of the VM 372. The VM 372 sends the ARP response 720 back to the VM 362 (e.g., via leaf node 324, spine node 330, and leaf node 320), enabling the VM 362 to store the MAC address associated with the VM 372. Once the VM 362 received the ARP response 720, the VM 362 can store the MAC address of the VM 372. Since the VM 372 received the MAC address of the VM 362 in the ARP request 710, VM 372 and VM 362 can now communicate with each other in Layer 2 communications.

Figure 8:
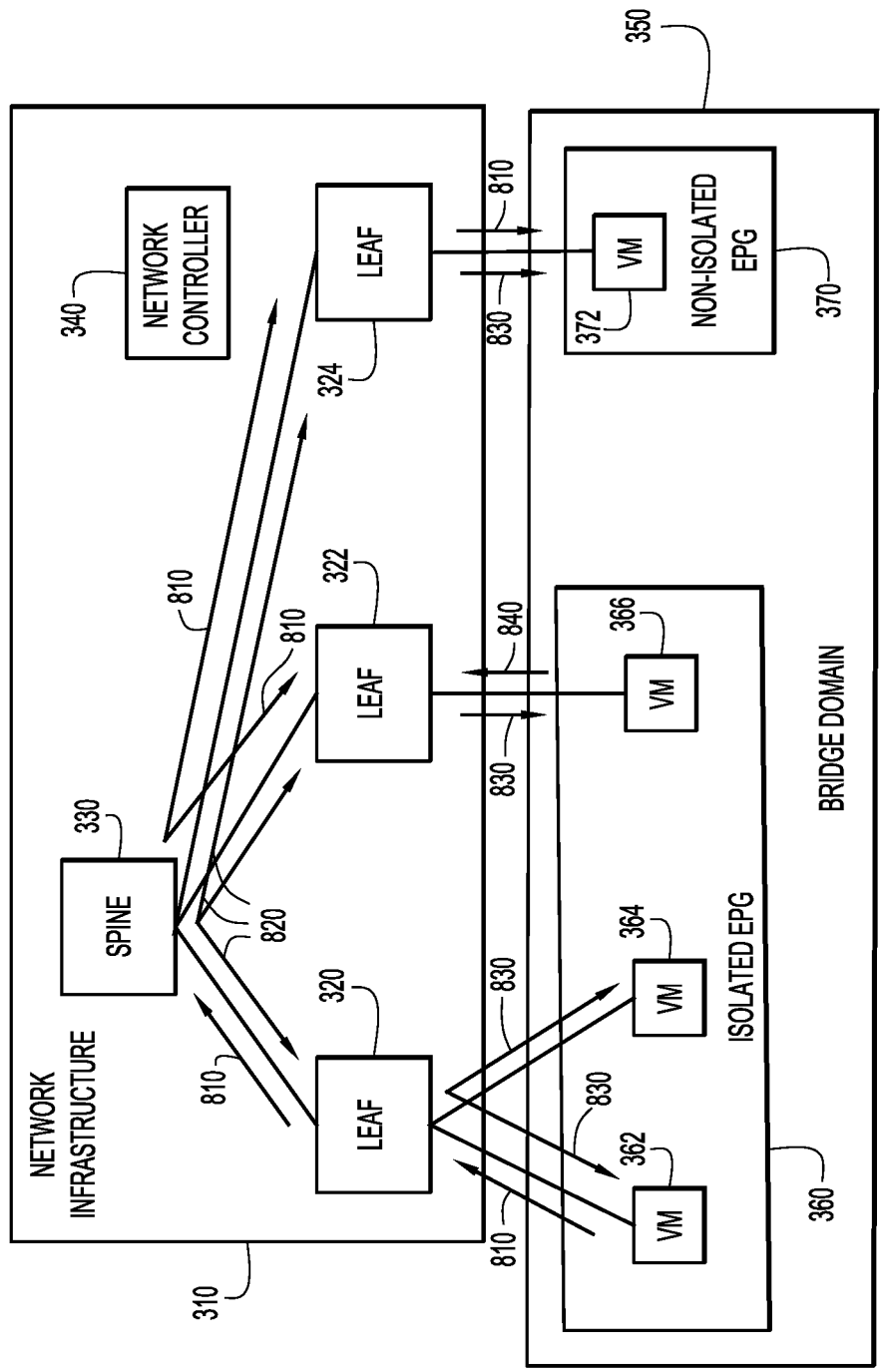
FIG. 8 is a simplified block diagram for initiating communication between two isolated endpoints in a flooding ARP environment, in which the address of the destination endpoint is unknown, according to an example embodiment.

Referring now to FIG. 8, a simplified block diagram illustrates a proxy ARP resolution for an isolated destination endpoint VM 366 that is not known to the network infrastructure 310, and in which the network infrastructure 310 is configured to flood ARP requests to all of the relevant leaf nodes. Initially, the source endpoint VM 362 sends an ARP request 810 to determine the MAC address of destination endpoint VM 366. Leaf node 320 receives the ARP request 810 and determines that the leaf node 320 has not stored the MAC address of the VM 366. The leaf node 320 forwards the ARP request 810 to the spine node 330, and the spine node 330 floods the ARP request 810 to the other leaf nodes 322 and 324 that communicate with the bridge domain 350. Since the ARP request 810 originated from an isolated endpoint VM 362, the leaf node 322 drops the ARP request 810, rather than expose the MAC address of the VM 362 to another endpoint in the isolated EPG 360 (e.g., VM 366). The leaf node 324 forwards the ARP request 810 to the VM 372, since the VM 372 is in the non-isolated EPG 370.

The spine node 330 also determines that the MAC address for the VM 366 is not stored in the network infrastructure 310, and initiates a glean ARP request 820. The spine node 330 sends the glean ARP request 820 to all of the leaf nodes that communicate with the bridge domain 350, i.e., leaf nodes 320, 322, and 324. Each of the leaf nodes 320, 322, and 324 receives the glean ARP request 820 and generates a proxy ARP request 830. The proxy ARP request 830 is generated with the network address associated with the network infrastructure 310 (e.g., the Switched Virtual Interface (SVI) MAC and IP addresses). Each leaf node sends the proxy ARP request 830 to any attached endpoints in the bridge domain 350.

The VM 366 receives the proxy ARP request 830 and responds with an ARP response 840 directed to the leaf node 322 of the network infrastructure 310. Since the VM 366 only received the proxy ARP 830 with a source address corresponding to the network infrastructure 310, instead of the actual ARP request 810 from the VM 362, the VM 366 does not have access to the MAC address of the source VM 362. Once the leaf node 322 receives the ARP response 840, the leaf node 322 stores the MAC address of the VM 366, and can send a proxy ARP response for VM 366 in response to any subsequent ARP requests.

Figure 9:
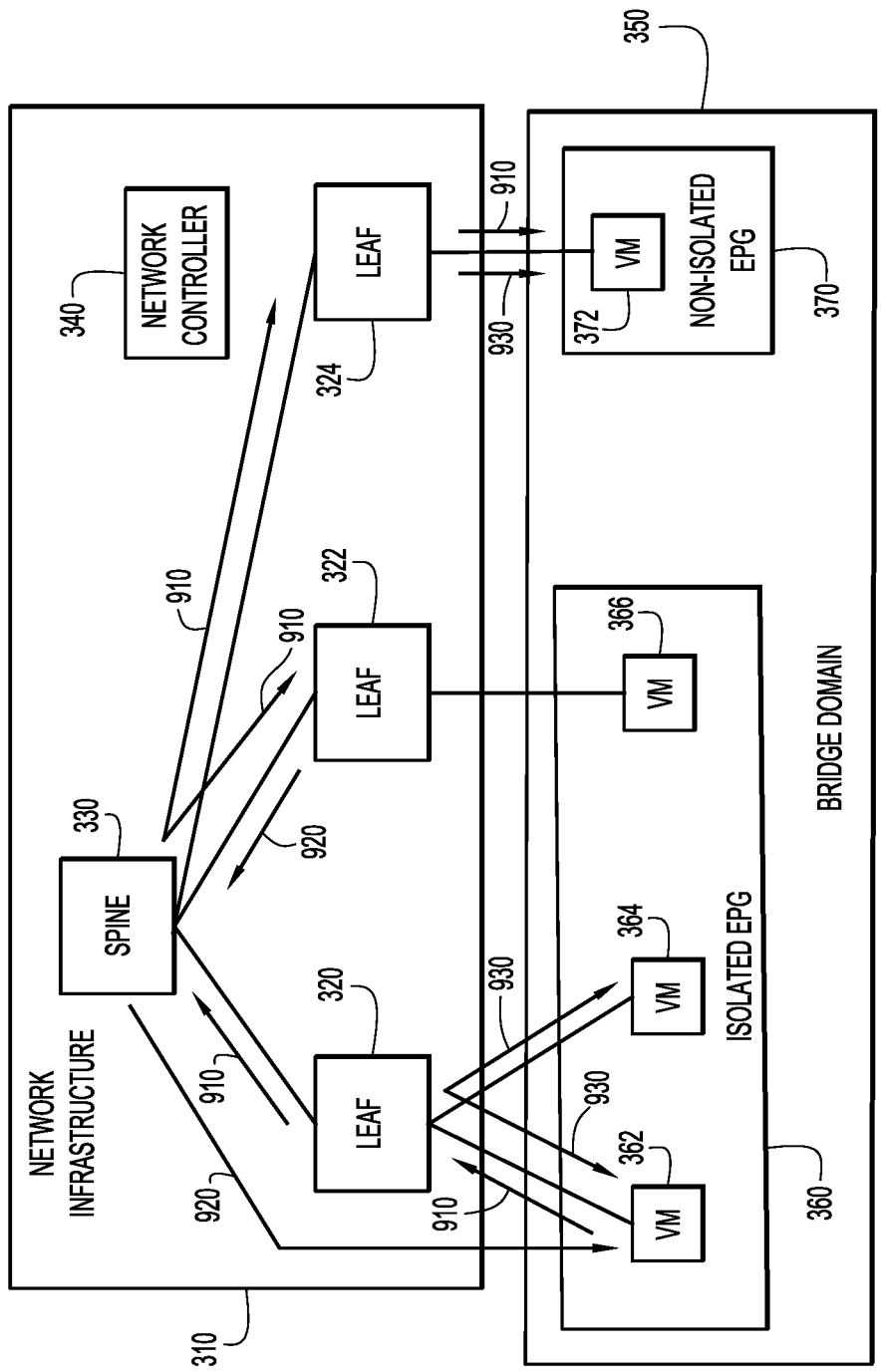
FIG. 9 is a simplified block diagram for initiating communication between two isolated endpoints in a flooding ARP environment, in which the address of the destination endpoint is known, according to an example embodiment.

Referring now to FIG. 9, a simplified block diagram illustrates a proxy ARP resolution for an isolated destination endpoint VM 366 that is known to the network infrastructure 310 (e.g., at leaf node 322), and in which the network infrastructure 310 is configured to flood ARP requests to all of the relevant leaf nodes. Initially, the source endpoint VM 362 sends an ARP request 910 to determine the MAC address of destination endpoint VM 366. Leaf node 320 receives the ARP request 910 and determines that the leaf node 320 has not stored the MAC address of the VM 366. The leaf node 320 forwards the ARP request 910 to the spine node 330, and the spine node 330 floods the ARP request 910 to the other leaf nodes 322 and 324 that communicate with the bridge domain 350. Since the ARP request 910 originated from an isolated endpoint VM 362, the leaf node 322 drops the ARP request 910, rather than expose the MAC address of the VM 362 to another endpoint in the isolated EPG 360 (e.g., VM 366). The leaf node 324 forwards the ARP request 910 to the VM 372, since the VM 372 is in the non-isolated EPG 370.

The leaf node 322 receives the ARP request 910 for the destination VM 366 and determines that both the source and the target of the ARP request 910 are in an isolated EPG. The leaf node 322 generates a proxy ARP response 920 that associates a network address associated of the network infrastructure 310 with the target VM 366. In one example, the ARP request 910 is punted to the software supervisor in the leaf node 322, which generates the proxy ARP response 920. The leaf node 322 sends the proxy ARP response 920 back to the VM 362 that initiated the ARP request 910, enabling the isolated VM 362 to communicate with the isolated VM 366 though the network infrastructure 310 through Layer 3 communications.

Additionally, leaf nodes 320 and 324 may generate glean/proxy ARP requests 930 in response to receiving the ARP request 910 to determine the address of the target endpoint VM 362. The leaf nodes 320 and 324 send the proxy ARP requests 930 to their respective endpoints, but will not receive a response, since the target endpoint is not attached to either leaf node 320 or leaf node 324.

Figure 10:
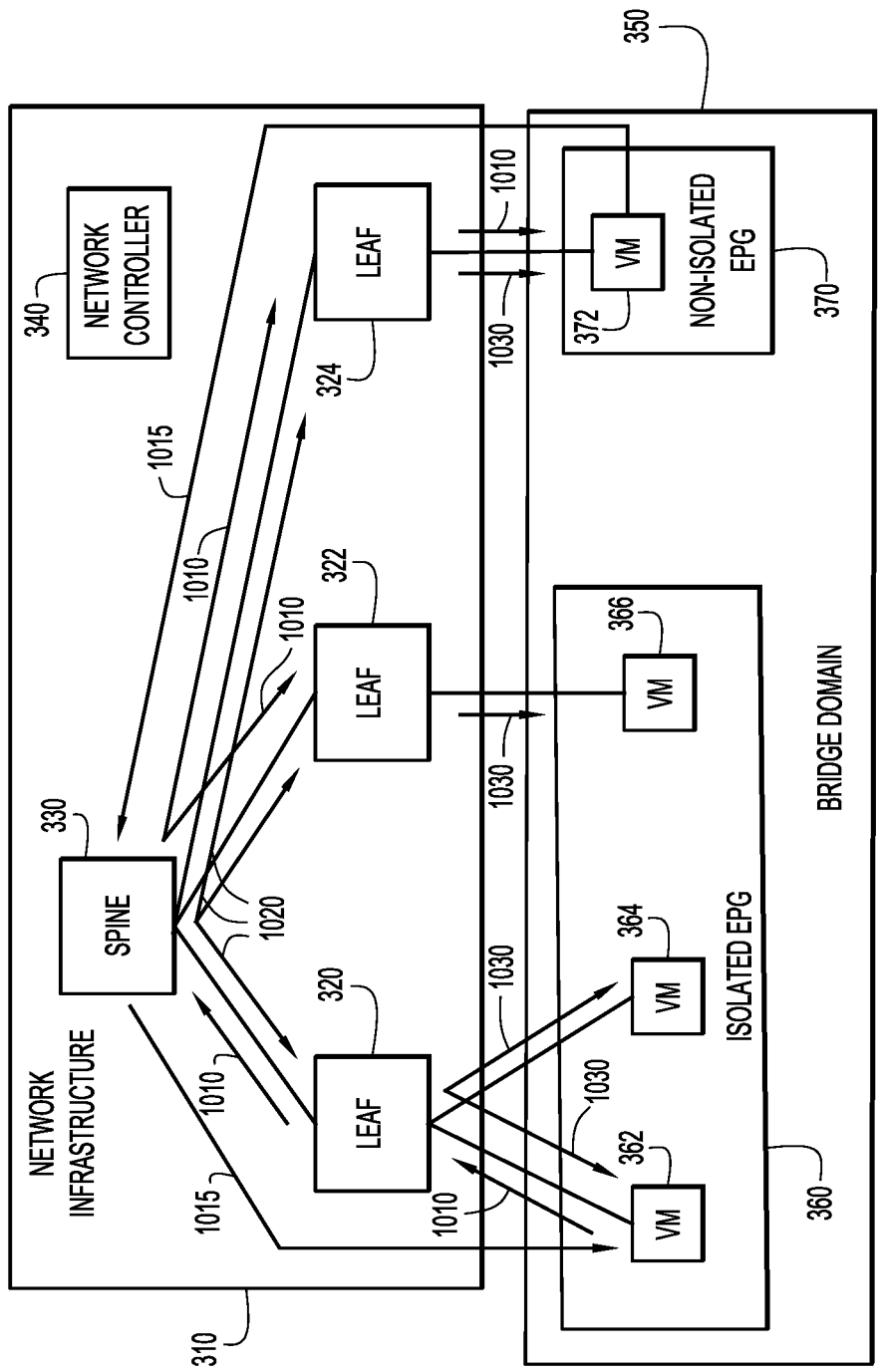
FIG. 10 is a simplified block diagram for initiating communication from an isolated endpoint to a non-isolated endpoint in a flooding ARP environment, according to an example embodiment.

Referring now to FIG. 10, a simplified block diagram illustrates a proxy ARP resolution for a non-isolated destination endpoint VM 372, in which the network infrastructure 310 is configured to flood ARP requests to all of the relevant leaf nodes. Initially, the source endpoint VM 362 sends an ARP request 1010 to determine the MAC address of destination endpoint VM 372. Leaf node 320 receives the ARP request 1010 and determines that the leaf node 320 has not stored the MAC address of the VM 372. The leaf node 320 forwards the ARP request 1010 to the spine node 330, and the spine node 330 floods the ARP request 1010 to the other leaf nodes 322 and 324 that communicate with the bridge domain 350. Since the ARP request 1010 originated from an isolated endpoint VM 362, the leaf node 322 drops the ARP request 1010, rather than expose the MAC address of the VM 362 to another endpoint in the isolated EPG 360 (e.g., VM 366). The leaf node 324 forwards the ARP request 1010 to the VM 372, since the VM 372 is in the non-isolated EPG 370.

Since the VM 372 is not isolated, the leaf node 324 forwards the actual ARP request 1010 from the VM 362 to the VM 372. The VM 372 receives the ARP request 1010 and generates an ARP response 1015 including the MAC address of the VM 372. The VM 372 sends the ARP response 1015 back to the VM 362 (e.g., via leaf node 324, spine node 330, and leaf node 320), enabling the VM 362 to store the MAC address associated with the VM 372. Once the VM 362 received the ARP response 1015, the VM 362 can store the MAC address of the VM 372. Since the VM 372 received the MAC address of the VM 362 in the ARP request 1010, VM 372 and VM 362 can now communicate with each other in Layer 2 communications.

If the MAC address for the destination endpoint VM 372 has not been stored in the network infrastructure 310, then the spine node 330 sends a glean ARP request 1020 to all of the leaf nodes that communicate with the bridge domain 350, i.e., leaf nodes 320, 322, and 324. Each of the leaf nodes 320, 322, and 324 receives the glean ARP request 1020 and generates a proxy ARP request 1030. The proxy ARP request 1030 is generated with the network address associated with the network infrastructure 310 (e.g., the Switched Virtual Interface (SVI) MAC and IP addresses). Each leaf node sends the proxy ARP request 1030 to any attached endpoints in the bridge domain 350.

Figure 11:
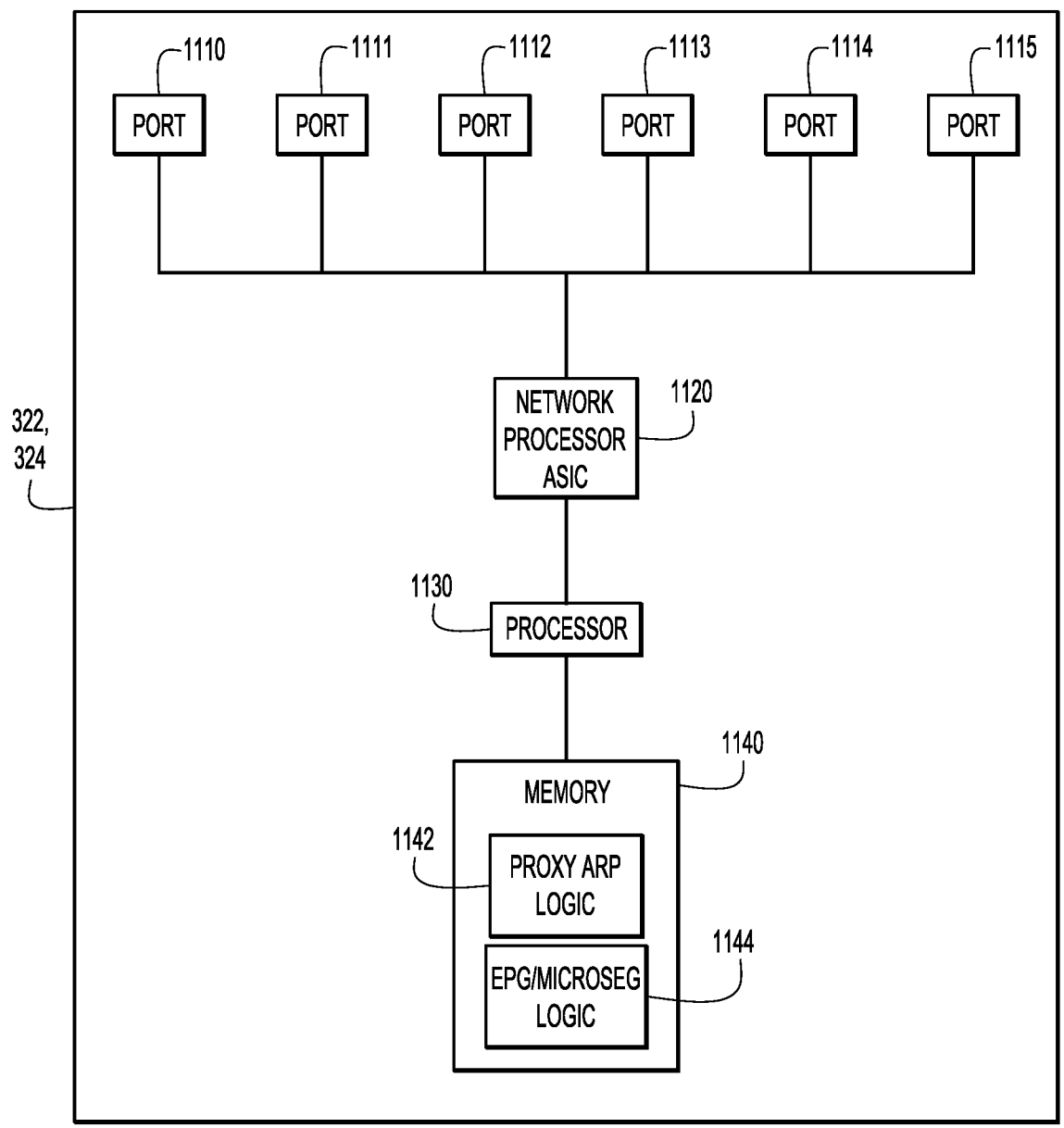
FIG. 11 is a simplified block diagram of a network device configured to perform endpoint isolation and microsegmentation, according to an example embodiment.

Referring now to FIG. 11, a simplified block diagram illustrates a network device (e.g., leaf node/switch 322 or 324) that is configured to participate in the techniques presented herein. The networking device includes a network interface unit in the form of a plurality of network ports 1110-1115, a processor Application Specific Integrated Circuit (ASIC) 1120 that performs network processing functions, one or more processors 1130 (e.g., microprocessors or microcontrollers), and memory 1140. The memory 1140 stores proxy ARP logic 1142 and intra-EPG isolation/microsegmentation logic 1144, which may include instructions for processing the EPG-based handling of packets from isolated EPGs. It is to be understood that, in certain examples, the network device may be a virtual (software-based) appliance.

The memory 1140 may include read only memory (ROM), random access memory (RAM), magnetic disk storage media devices, optical storage media devices, flash memory devices, electrical, optical, or other physical/tangible memory storage devices. Thus, in general, the memory 1140 may comprise one or more tangible (non-transitory) computer readable storage media (e.g., a memory device) encoded with software comprising computer executable instructions and when the software is executed (by the one or more processors 1130) it is operable to perform the operations described herein with reference to a leaf node.

Figure 12:
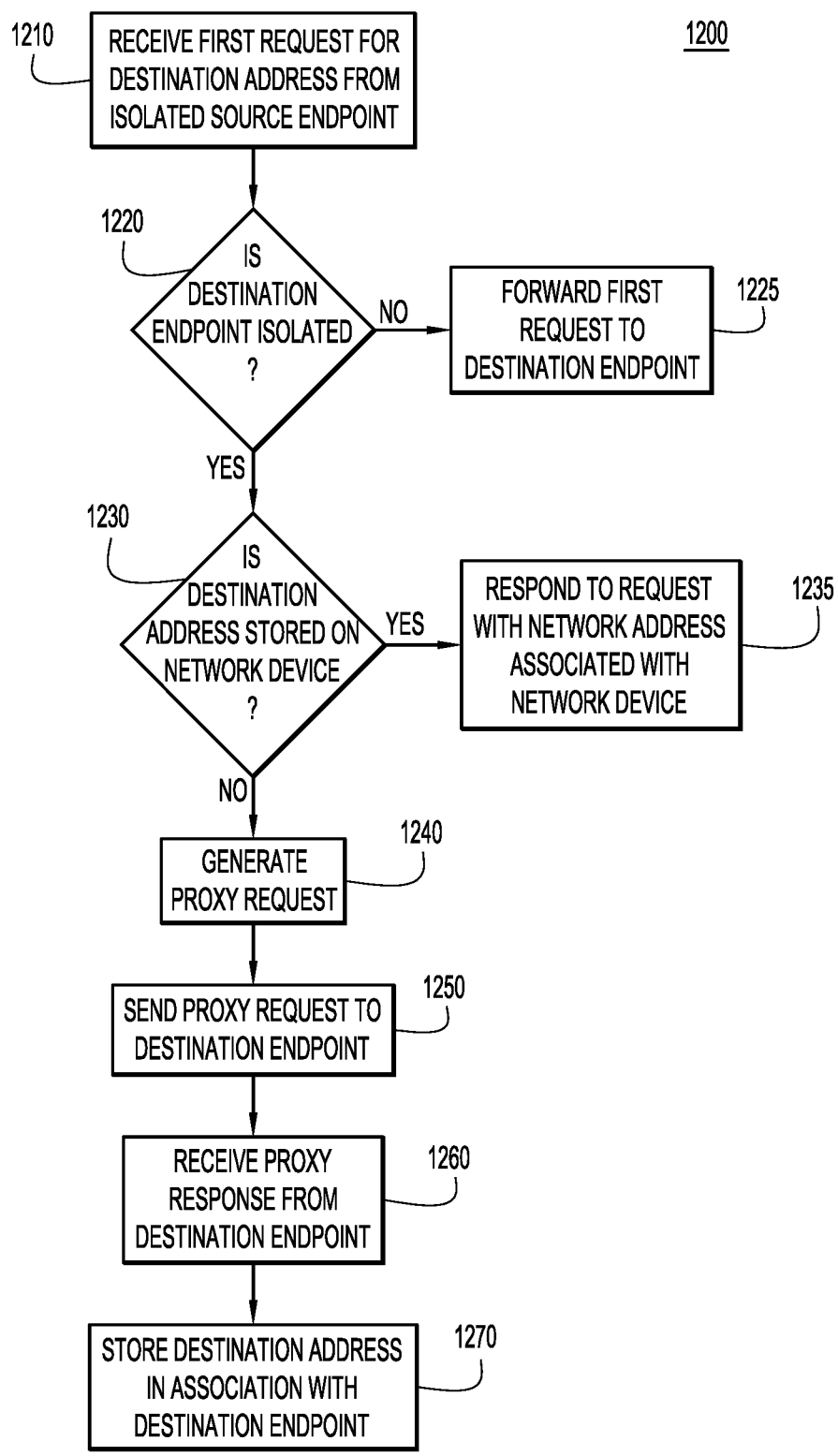
FIG. 12 is a flowchart depicting operations of a network device implanting endpoint isolation and microsegmentation during address resolution of destination endpoints, according to an example embodiment.

Referring now to FIG. 12, a flowchart illustrates a process 1200 performed by network device (e.g., leaf node 322 or 324) in implementing proxy Arp resolution in a computing environment with intra-EPG isolation and microsegmentation. In step 1210, the network device receives a first request for a destination address of a destination endpoint from an isolated source endpoint. In one example, the first request is an ARP request targeted to determine a MAC address of a destination endpoint. If the destination endpoint is not isolated (e.g., it belongs to a non-isolated EPG), as determined in step 1220, then the network device forwards the first request to the destination endpoint in step 1225.

If the destination endpoint is isolated, as determined in step 1220, then the network device determines whether the destination address is stored on the network device in step 1230. If the destination address is stored at the network device, then the network device responds to the first request with a response that associates the destination endpoint with a network address associated with the network device in step 1235. In one example, this response forces the source endpoint to communicate with the destination endpoint via the network device as a layer 3 router.

If the destination address is not stored on the network device, as determined in step 1230, then the network device generates a proxy request for the destination address at step 1240. The network device sends the proxy request to the destination endpoint in step 1250 and receives a proxy response from the destination endpoint in step 1260. In one example, the network device sends the proxy request to all of the endpoints attached to the network device. Once the network device receives the proxy response with the destination address of the destination endpoint, the network device stores the destination address in association with the destination endpoint in step 1270.

In summary, with proxy-ARP and isolation, the endpoints are prevented from doing any MAC spoofing attacks. Only regulated traffic will flow through the system, since only Layer 3 communication can happen between known endpoints. Additionally, the endpoints can communicate with each other using microsegment-based pcTags and contracts, thus improving VLAN scale.

The techniques presented herein are unique in several ways, as explained below.

a) Unique Proxy-ARP behavior: The network fabric will send proxy-ARP response only if the endpoint (target VM) is learned. If not, it will just glean that from an ARP request. Because the network fabric does not send a proxy-ARP response for any unknown endpoints, no unwanted traffic will be consumed within the network fabric.

b) Within a bridge-domain, communication can be between isolated EPGs to any regular service EPG like a firewall or load balancer. The network fabric will ensure only the real MAC addresses of isolated VMs will be hidden from each other. Any regular EPG will still be able to see the real MAC of isolated VMs.

c) Since the network fabric follows the Clos model, a source VM can be behind one ToR switch and the target VM can be behind another ToR switch. Consequently, the whole context of "ARP requests coming from isolated VMs" are carried across ToRs (across even multi-pods/multi-sites), so that remote ToRs can still identify that the ARP request was received from an isolated VM. This leads to tremendous improvements in contracts scale (since it is not necessary to classify on pcTag in order to identify the isolated context).

d) Since VMs can move across ToRs, the proxy ARP response is sent to the source VM, only by the ToR on which the target VM is locally learned. This is done to avoid any mis-forwarding, when VMs are migrating across ToRs.

e) Communication between microsegmented EPGs are allowed via whitelist policies through IP/MAC/VM attributes. This leads to tremendous savings to VLAN scale.

f) Since the network fabric has complete knowledge about VMs, complete security can be achieved when communication across VMs are happening through network fabric. That is, all security is enforced by the network. This means hypervisor/VMs/servers can become lightweight.

The operations described herein may be implemented by software instructions stored in memory executed by one or more processors of a network or computing device. The memory may include read only memory (ROM), random access memory (RAM), magnetic disk storage media devices, optical storage media devices, flash memory devices, electrical, optical, or other physical/tangible memory storage devices. Thus, in general, the memory may comprise one or more tangible (non-transitory) computer readable storage media (e.g., a memory device) encoded with software comprising computer executable instructions and when the software is executed (by the controller) it is operable to perform the operations described herein.

To summarize, in one form, a method is provided comprising: receiving at a network device, a first request for a destination address associated with a destination endpoint, the first request originating from an isolated source endpoint; determining whether the destination address is stored on the network device in association with the destination endpoint; and responsive to a determination that the destination address is not stored in association with the destination endpoint, generating a proxy request for the destination address, sending the proxy request to at least one endpoint attached to the network device, receiving a proxy response from the destination endpoint with the destination address, and storing the destination address in association with the destination endpoint.

In another form, an apparatus is provided comprising: a network interface unit configured to communicate with a plurality of endpoints; a memory configured to store network addresses and endpoint tags associated with each of the plurality of endpoints; and a processor configured to: receive via the network interface unit, a first request for a destination address associated with a destination endpoint among the plurality of endpoints, the first request originating from an isolated source endpoint; determine whether the destination address is stored in the memory in association with the destination endpoint; and responsive to a determination that the destination address is not stored in association with the destination endpoint, generate a proxy request for the destination address, send the proxy request to the plurality of endpoints via the network interface unit, receive a proxy response from the destination endpoint via the network interface unit with the destination address, and store the destination address in the memory in association with the destination endpoint.

In still another form, one or more non-transitory computer readable storage media encoded with software comprising computer executable instructions and, when the software is executed by a processor on a network device, operable to cause the processor to: receive a first request for a destination address associated with a destination endpoint, the first request originating from an isolated source endpoint; determine whether the destination address is stored on the network device in association with the destination endpoint; and responsive to a determination that the destination address is not stored in association with the destination endpoint, generate a proxy request for the destination address, send the proxy request to at least one endpoint attached to the network device, receive a proxy response from the destination endpoint with the destination address, and store the destination address in association with the destination endpoint.

The above description is intended by way of example only. Although the present disclosure has been described in detail with reference to particular arrangements and configurations, these example configurations and arrangements may be changed significantly without departing from the scope of the present disclosure.

What is claimed is:

1. A method comprising:
   obtaining at a leaf network device from a spine network device, a glean request for a destination address associated with a destination endpoint, the glean request based on a first Address Resolution Protocol (ARP) request from a source endpoint in an isolated endpoint group, wherein the source endpoint and the destination endpoint are in a single bridge domain for Layer 2 communication;

generating a proxy ARP request for the destination address, the proxy ARP request including a network infrastructure Internet Protocol (IP) address and a network infrastructure Media Access Control (MAC) address as a source of the proxy ARP request;

providing the proxy ARP request to at least one endpoint;

obtaining a proxy ARP response from the destination endpoint with the destination address; and storing the destination address at the leaf network device in association with the destination endpoint.

2. The method of claim 1, further comprising:

determining that the destination endpoint is in the isolated endpoint group;

generating a second proxy ARP response associating the network infrastructure MAC address with the destination endpoint; and providing the second proxy ARP response to the source endpoint.

3. The method of claim 2, wherein the destination endpoint is determined to be in the isolated endpoint group based on a destination endpoint tag associated with the destination endpoint.

4. The method of claim 1, wherein the source endpoint is determined to be in the isolated endpoint group based on a source endpoint tag associated with the source endpoint.

5. The method of claim 1, wherein the destination address is a destination Media Access Control (MAC) address associated with the destination endpoint.

6. The method of claim 1, wherein the destination endpoint is associated with a destination endpoint tag comprising an indication of an isolated endpoint group, a non-isolated endpoint group, an isolated microsegment, or a non-isolated microsegment.

7. The method of claim 1, further comprising:

determining that the destination endpoint is in a non-isolated endpoint group; and providing the proxy ARP response to the source endpoint, the proxy ARP response enabling the source endpoint to associate the destination endpoint with the destination address.

8. An apparatus comprising:

a network interface configured to communicate with a plurality of endpoints;

a memory configured to store network addresses and endpoint tags associated with each of the plurality of endpoints; and a processor configured to:

obtain from a spine network device via the network interface, a glean request for a destination address associated with a destination endpoint, the glean request based on a first Address Resolution Protocol (ARP) request from a source endpoint in an isolated endpoint group, wherein the source endpoint and the destination endpoint are in a single bridge domain for Layer 2 communication;

generate a proxy ARP request for the destination address, the proxy ARP request including a network infrastructure Internet Protocol (IP) address and a network infrastructure Media Access Control (MAC) address as a source of the proxy ARP request;

provide via the network interface, the proxy ARP request to at least one endpoint of the plurality of endpoints;

obtain via the network interface, a proxy ARP response from the destination endpoint with the destination address; and store the destination address in the memory in association with the destination endpoint.

9. The apparatus of claim 8, wherein the processor is further configured to:

determine that the destination endpoint is in the isolated endpoint group;

generate a second proxy ARP response associating the network infrastructure MAC address with the destination endpoint; and provide via the network interface, the second proxy ARP response to the source endpoint.

10. The apparatus of claim 9, wherein the processor is configured to determine that the destination endpoint is in the isolated endpoint group based on a destination endpoint tag associated with the destination endpoint.

11. The apparatus of claim 8, wherein the processor is configured to determine that the source endpoint is in the isolated endpoint group based on a source endpoint tag associated with the source endpoint.

12. The apparatus of claim 8, wherein the destination address is a destination Media Access Control (MAC) address associated with the destination endpoint.

13. The apparatus of claim 8, wherein the destination endpoint is associated with a destination endpoint tag comprising an indication of an isolated endpoint group, a non-isolated endpoint group, an isolated microsegment, or a non-isolated microsegment.

14. The apparatus of claim 8, wherein the processor is further configured to:

determine that the destination endpoint is in a non-isolated endpoint group; and provide via the network interface, the proxy ARP response to the source endpoint, the proxy ARP response enabling the source endpoint to associate the destination endpoint with the destination address.

15. One or more non-transitory computer readable storage media encoded with software comprising computer executable instructions and, when the software is executed by a processor on a leaf network device, operable to cause the processor to:

obtain from a spine network device, a glean request for a destination address associated with a destination endpoint, the glean request based on a first Address Resolution Protocol (ARP) request from a source endpoint in an isolated endpoint group, wherein the source endpoint and the destination endpoint are in a single bridge domain for Layer 2 communication;

generate a proxy ARP request for the destination address, the proxy ARP request including a network infrastructure Internet Protocol (IP) address and a network infrastructure Media Access Control (MAC) address as a source of the proxy ARP request;

provide the proxy ARP request to at least one endpoint;

obtain a proxy ARP response from the destination endpoint with the destination address; and store the destination address in association with the destination endpoint.

16. The non-transitory computer readable storage media of claim 15, further comprising instructions operable to cause the processor to:

determine that the destination endpoint is in the isolated endpoint group;

generate a second proxy ARP response associating the network infrastructure MAC address with the destination endpoint; and provide the second proxy ARP response to the source endpoint.

17. The non-transitory computer readable storage media of claim 16, further comprising instructions operable to cause the processor to determine that the destination endpoint is in the isolated endpoint group based on a destination endpoint tag associated with the destination endpoint.

18. The non-transitory computer readable storage media of claim 15, further comprising instructions operable to cause the processor to determine that the source endpoint is in the isolated endpoint group based on a source endpoint tag associated with the source endpoint.

19. The non-transitory computer readable storage media of claim 15, wherein the destination address is a destination Media Access Control (MAC) address associated with the destination endpoint.

20. The non-transitory computer readable storage media of claim 15, further comprising instructions operable to cause the processor to:

determine that the destination endpoint is in a non-isolated endpoint group; and provide the proxy ARP response to the source endpoint, the proxy ARP response enabling the source endpoint to associate the destination endpoint with the destination address.

* * * * *